(12) United States Patent
Zhang (10) Patent No.: US 9,940,047 B1
(45) Date of Patent: Apr. 10, 2018

(54) APPLICATION RESOURCE USAGE BEHAVIOR ANALYSIS

(71) Applicant: EMC IP Holding Company LLC, Hopkinton, MA (US)

(72) Inventor: Feng Zhang, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/429,293

(22) Filed: Feb. 10, 2017

Related U.S. Application Data (63) Continuation of application No. 12/490,481, filed on Jun. 24, 2009, now Pat. No. 9,600,182.

(51) Int. Cl.
*G06F 3/00* (2006.01)
*G06F 13/38* (2006.01)
*G06F 3/06* (2006.01)
*G06F 13/16* (2006.01)

(52) U.S. Cl.
CPC .......... *G06F 3/0619* (2013.01); *G06F 3/0635* (2013.01); *G06F 3/0641* (2013.01); *G06F 3/0659* (2013.01); *G06F 3/0689* (2013.01); *G06F 13/1642* (2013.01)

(58) Field of Classification Search
None
See application file for complete search history.

*Primary Examiner* — Farley Abad
*Assistant Examiner* — Dayton Lewis-Taylor
(74) *Attorney, Agent, or Firm* — Krishnendu Gupta; Robert Kevin Perkins (57) ABSTRACT

A method, system, and apparatus are disclosed, which include injecting shadow input/outputs (shadow IOs) into a system, removing the shadow IOs from the system, storing the shadow IOs, and analyzing the stored shadow IOs to determine application specific behavioral information about the system.

20 Claims, 7 Drawing Sheets

APPLICATION RESOURCE USAGE BEHAVIOR ANALYSIS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to application IT resource usage and behaviors.

BACKGROUND

In many computer systems using external data storage subsystems, there are multiple physical paths, or buses, to each data storage subsystem. One reason for having multiple paths is to provide redundancy in the case of a failed path. The selection of a path for sending an I/O request can affect the quality of service for applications initiating I/O requests because paths have limited capacity for carrying data. Path capacity limitations may be the result of multiple influences, such as the fundamental bandwidth limitation of the physical connection or the storage subsystem's front-end resources for processing requests.

SUMMARY

A method, system, and apparatus are disclosed, which include injecting shadow input/outputs (shadow IOs) into a system, removing the shadow IOs from the system, storing the shadow IOs, and analyzing the stored shadow IOs to determine application specific behavioral information about the system.

DETAILED DESCRIPTION

Current application resource management solutions are typically limited in understanding behavior of application IT resource usage and behavior. However, Application focused solutions could benefit from application-specific behavioral knowledge. The techniques described herein provide the ability to understand application resource usage behavior and generate real-time or historical traffic map for a data center.

In an embodiment, these techniques may leverage the PowerPath architecture, described herein, to perform application specific behavioral analysis. This may be performed by creating shadow Input/Outputs (shadow I/Os) and injecting these shadow I/Os into the system. The shadow I/Os may be cloned IOs, where the frequency and number of shadow I/Os injected may be determined through an adaptive sampling algorithm. As well, the shadow I/Os can be appended to an application data stream or can be the result of a test of the traffic currently on the system.

The sampling algorithm may be adaptive and can be tuned dynamically to fit business needs. The shadow IO can contain application information, performance data and resource consumption information. As well, a correlation engine may collect shadow IOs and analyze the information collected to understand application resource usage, QoS and traffic of a data center. The correlation engine may leverage structural configuration information collected by current EMC products. A real-time/historical traffic map can be generated to support change management decisions such as provisioning and datacenter rebalancing, etc.

The techniques described may dynamically collect and analyze the application-based use and behavior of IT resources. It may provide application level performance and resource usage behavior intelligence data. This data may enable and support new solutions in areas like Information Lifecycle Management, automatic application provisioning and business impact analysis.

For example, in a particular embodiment, an application collector may collect application information and pass it to a shadow IO manager in Powerpath. The shadow IO manager may collect roundtrip IO Quality of Service (QoS) data. Based on an adaptive sampling algorithm, new shadow IO packages data may be injected along with application 10 or just a shadow IO may be injected. The Shadow IOs may be collected. The shadow IO may be written to a special shadow storage device. As well, shadow IOs may be stamped by resources with additional resource information along the way. Once the shadow IO reaches its destination, which in this embodiment can be a special shadow device, behavior analysis appliance may collect application information and related resource information to build up an application dependency mapping. Behavior analysis appliance may collect QoS data from the special device to build weight for the paths utilized.

Figure 1:
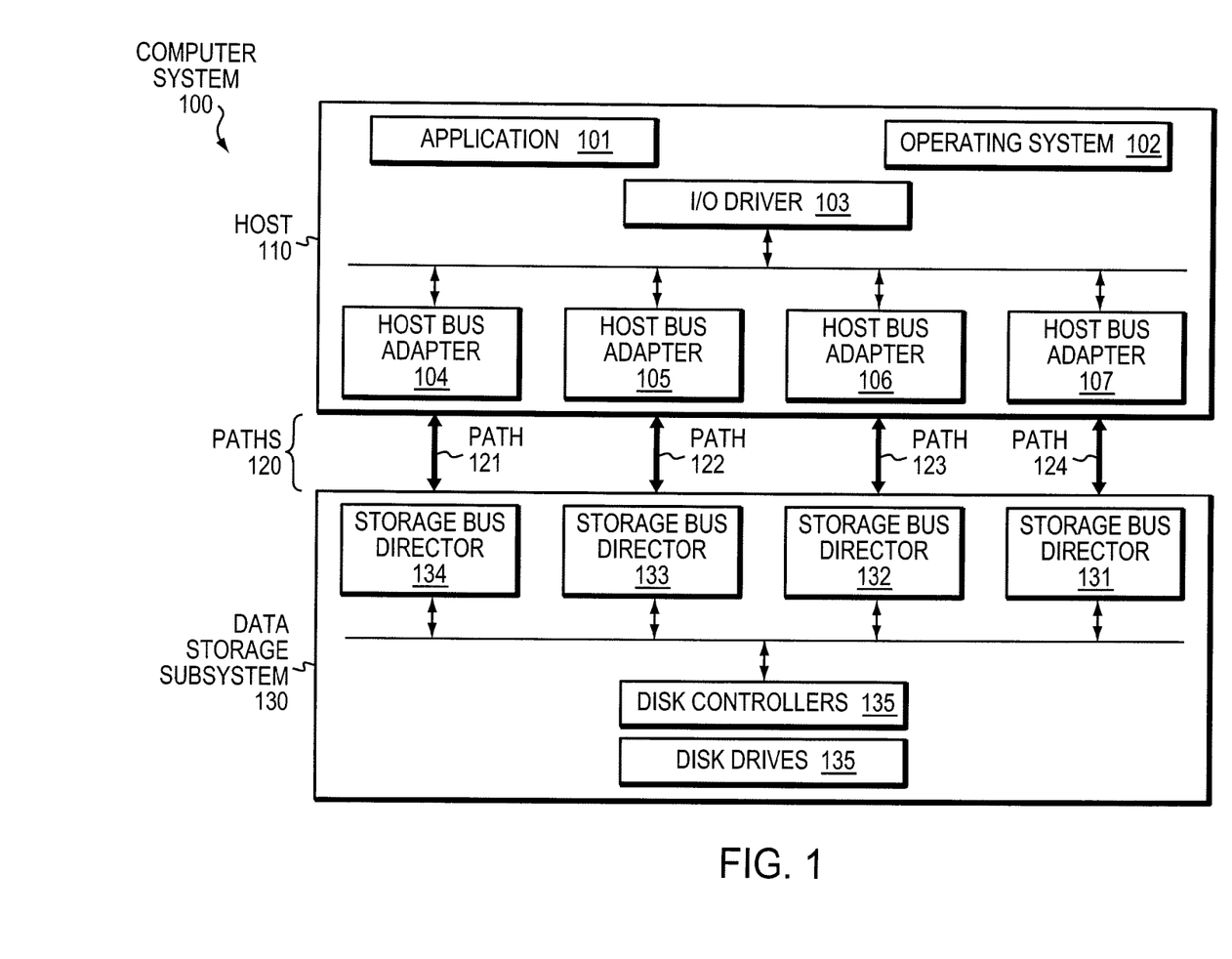
FIG. 1 shows an embodiment of a system on which the current techniques may be practiced.

Reference is now made in detail to exemplary embodiments of the invention, examples of which are illustrated in the accompanying drawings. A computer system may include multiple hosts and multiple data storage subsystems such each host may access data on each of data storage subsystems. For simplicity, however, FIG. 1 illustrates a computer system 100 that includes a single host 110 and a single data storage subsystem 130. Applications 101 running on operating system 102 of host 110 may access data in data storage subsystem 130 via I/O driver 103 and host bus adapters 104, 105, 106, and 107. Host 110 can be, for example, a server, a personal computer, or any other device capable of initiating read and write requests to data storage subsystem 130. Data storage subsystem 130 can be a single physical data storage device or a data storage system comprising multiple physical data storage devices including an enterprise storage system. For example, data storage subsystem 130 may be a SYMMETRIX data storage system, available from EMC Corporation of Hopkinton, Mass., a CLARIION data storage system available from EMC Corp., a TagmaStore data storage system available from Hitachi Data Systems Corp. of Santa Clara, Calif., or a FAStT data storage system available from IBM. In computer systems consistent with the principles of the invention, there may be a plurality of data storage subsystems 130 accessible by host 110 and each data storage subsystem may be unique.

Host 110 has multiple paths 120 for sending I/O requests to data storage subsystem 130. Typically, there are at least two paths from a host to a data storage subsystem. Generally, there may be up to 32 paths. FIG. 1 shows four paths from host 110 to data storage subsystem 130: path 121, path 122, path 123, and path 124. Each of the paths 120 can be any of a number of different types of communication links that allow data to be passed between data storage subsystem 130 and host 110. Each of the host bus adapters 104, 105, 106, and 107 would be adapted to communicate using an appropriate protocol via the paths 120. For example, path 120 can be implemented as a SCSI bus with host bus adapters 104 and storage bus director 134 each being a SCSI driver. Alternatively, path 120 between the host 110 and the data storage subsystem 130 may be a Fibre Channel fabric. Moreover, a path 120 may include multiple communication path types and may be part of a communication network.

Host 110 contains an operating system 102, applications 101, I/O driver 103, and host bus adapters 104, 105, 106, and 107. I/O driver 103 facilitates the sending of I/O requests from applications 101 running on host 110 to data storage subsystem 130. The I/O driver may queue I/O requests from host 110 directed to data storage subsystem 130. In addition, the I/O driver may implement algorithms to decide which I/O requests to send, how many I/O requests to send, and the speed at which to send I/O requests. The I/O driver may keep a record of I/O requests that are sent to data storage subsystem 130 until the I/O request is processed by data storage subsystem 130. An exemplary host I/O driver is the POWERPATH tool, available from EMC Corp. The POWERPATH tool may use known path selection techniques such as those described in U.S. Pat. No. 6,542,944, entitled "Method And Apparatus For Balancing Workloads Among Paths In A Multi-Path Computer System Based On The State Of Previous I/O Operations" and issued on Apr. 1, 2003 to EMC Corp. As well, application Ser. No. 11/682,049 labeled "Methods And Systems For Dynamic Division of Path Capacity" provides a further description thereof. Both U.S. Pat. No. 6,542,944 and application. Ser. No. 11/682,049 are hereby incorporated by reference.

Figure 2:
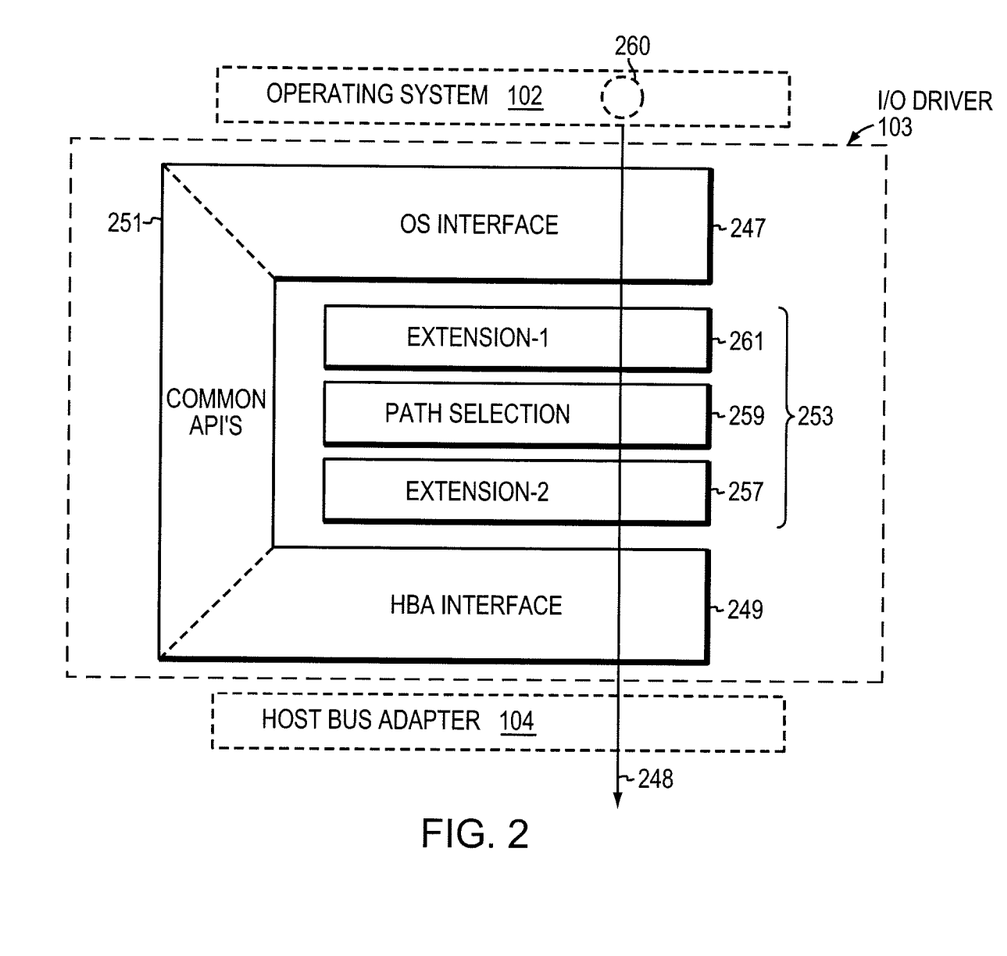
FIG. 2 shows an embodiment of a system on which the current techniques may be practiced.

FIG. 2 illustrates portions of an exemplary host including an I/O driver, consistent with features and principles of the present invention. Although I/O driver 103 only interacts with an operating system 102, I/O driver 103 can conceptually be considered to be placed between operating system 102 and at least one host bus adapter 104. I/O requests, such as I/O request 260, are passed from the operating system 102 to the I/O driver through the OS interface 247.

I/O driver 103 of FIG. 2 may be thought of conceptually as having the form of a "C" clamp with a top horizontal arm 247, a bottom horizontal arm 249, and a vertical connector 251 between the arms. Horizontal arm 247 may be, for example, an interface to any operating system (OS) such as LINUX, Sun's SOLARIS, IBM's AIX, HP's HPUX, and Microsoft's WINDOWS NT. Bottom horizontal arm 249 includes platform-dependent code comprising an interface to relevant host bus adapters 104, 105, 106, and 107. Only host bus adapter 104 is shown for exemplary purposes. Vertical connector 251 comprises a series of common Application Programming Interfaces (APIs). An advantage of the C clamp is that extensions can be written in a platform-independent manner because the arms 247, 249 translate all of the platform-dependent communications into more generic communications. An extension stack 253 is enveloped between arms 247 and 249. In addition to a plurality of existing extensions 261, 257 in extension stack 253, a path selection extension 259 is added to perform the logical division of path capacity. Path selection extension 259 can consist of a plurality of extensions.

The I/O driver, via path extension 259, may select a path by which to transmit an I/O request or group of I/O requests to data storage subsystem 130. I/O driver 103 would communicate with the appropriate host bus adapter 104, 105, 106, or 107 depending on which path is selected.

FIG. 2 illustrates a method 300 for selecting a path by which to send an I/O request from a host to an associated data storage subsystem from among a plurality of such paths. Method 300 may be used, for example, to select which path among paths 121, 122, 123, 124 by which to send a non-urgent I/O request from host 110 to data storage subsystem 130. Method 300 may be implemented in computer system 100, for example, as a path selection extension 259, or as part of another extension, in I/O driver 103 on host 110. Alternatively, method 300 may be implemented in computer system 100 as an application running on host 110 separate from the I/O driver.

Given that communication can be distributed across multiple paths, it can be useful to understand the behavioral characters of not only each path, but how each application has its IO distributed across the paths. Current application resource management solutions typically offer limited understanding of behavior of application IT resource usage and performance. As well, current application resource management techniques typically cannot distinguish behaviors among applications in the same host because of lack of application identity information. Therefore, the current techniques, in an embodiment, provide application focused solutions which yield application-specific behavioral knowledge data that may be helpful to understand system behavior.

Figure 3:
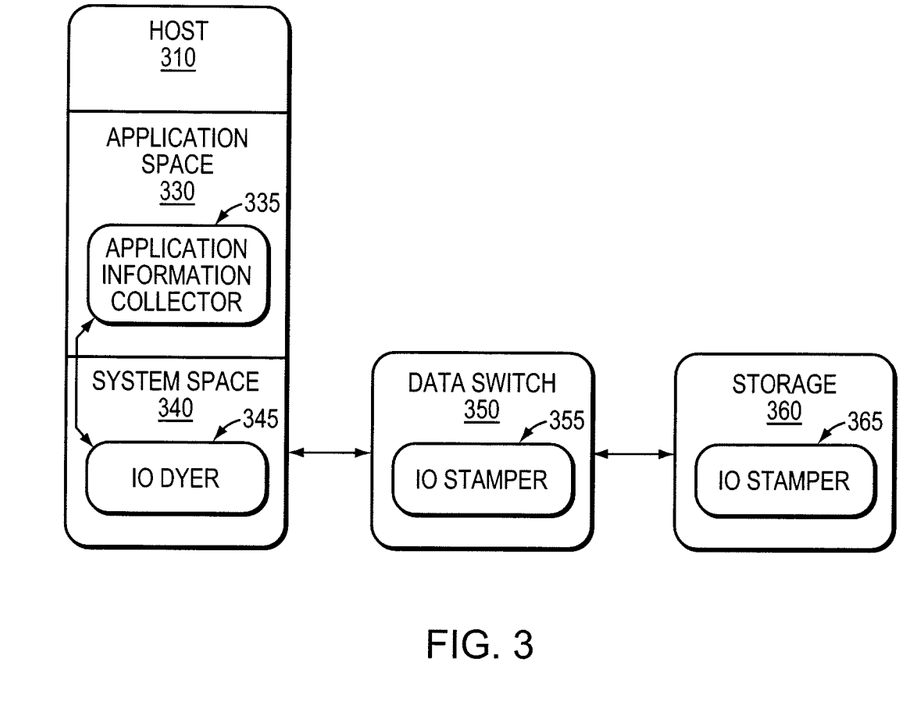
FIG. 3 shows an embodiment of a system on which the current techniques may be practiced.

FIG. 3 represents an embodiment of a system on which the current techniques may be applied. FIG. 3 represents a system having a host 310, and application space 330, and a system space 340. FIG. 3 is also an alternative embodiment of the system of FIG. 1. Within the application space 330, there may be one or more applications and an application information collector 335. The application space 330 sends I/Os from the applications to the system space 340, and to the IO Dyer 345. The I/Os may propagate through the system to Data Switch 350 where I/O Stamper 355 may stamp the I/O with additional information such as the time it passed through Data Switch 350. The I/O will also propagate to Storage 360 and will again be stamped with additional information by I/O stamper 365. The I/O make take multiple paths between Host 310, Data Switch 350, and Storage 360. As well, there may be multiple paths, hosts, switches, and storage units, for example, as illustrated in FIG. 1.

Figure 4:
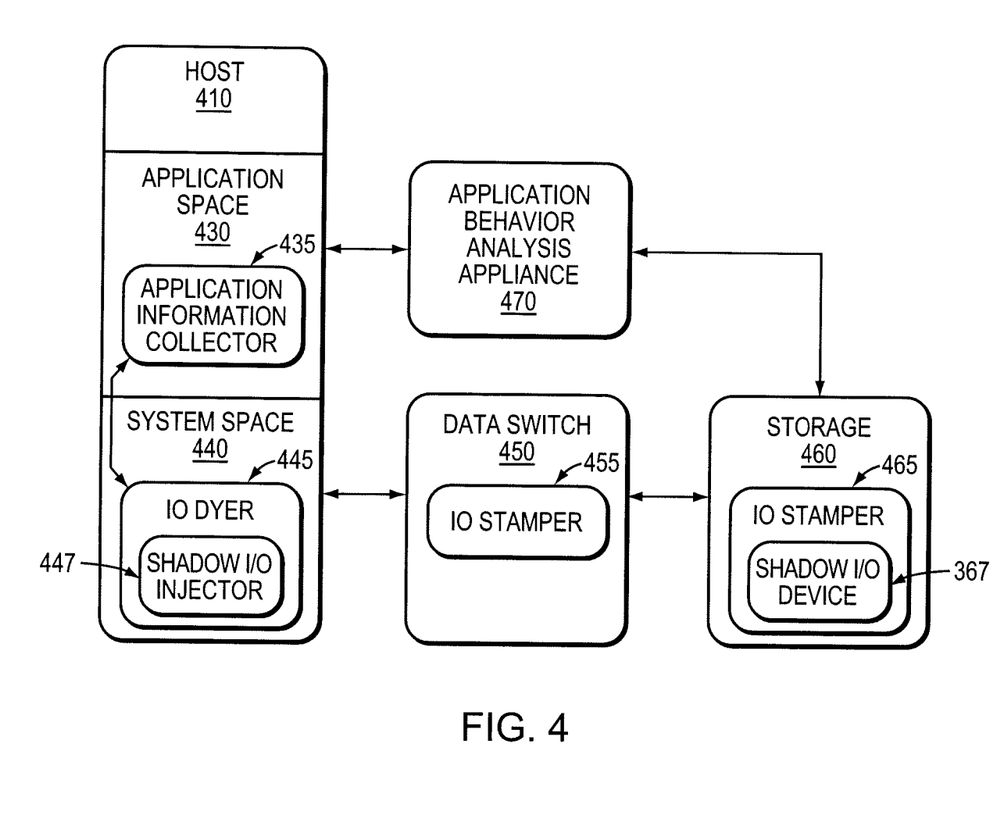
FIG. 4 shows an implementation of embodiment of the current techniques.

Refer now to FIG. 4. FIG. 4 represents an embodiment of one of the current techniques. FIG. 4 is similar to FIG. 3, although augmented to include a Shadow I/O injector 447, a Shadow I/O device 467, and an Application Behavior Analysis Appliance 470. Now, Refer to FIG. 4 in conjunction with FIG. 5, which further illustrates a technique of the current disclosure. When information I/O is in the system space 440 the Shadow I/O injector 447 may inject a shadow I/O, such as io3 535, into the system. Io3 535 may be injected along with I/O from a particular application, such as io3 510, or in isolation to test the current system.

Figure 5:
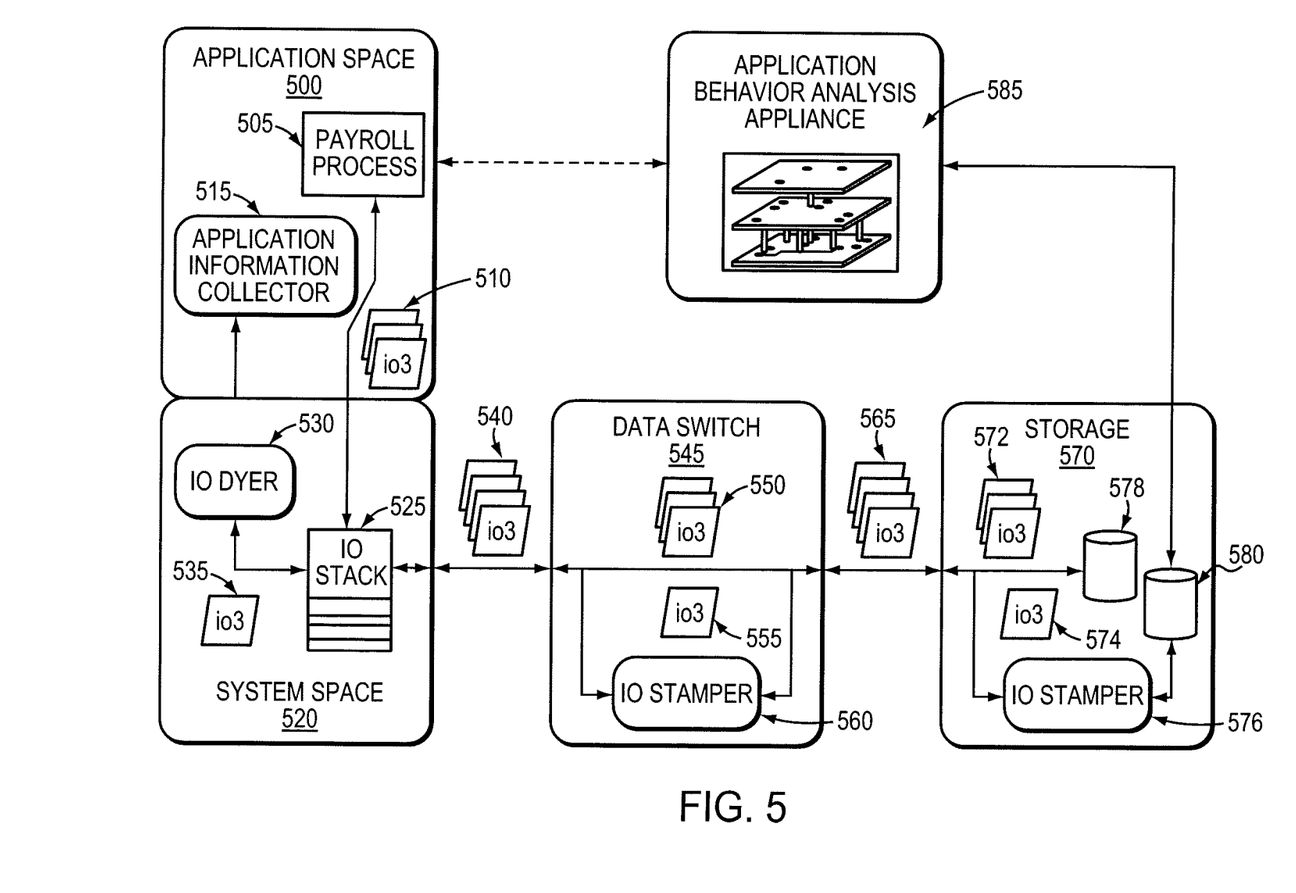
FIG. 5 shows an alternative implementation of embodiment of the current techniques.

In the embodiment of FIG. 5, io3 535, which is a shadow IO, is injected along with the I/O 510 of payroll process application 505. When io3 535 reaches Data Switch 545 it, along with the other application data I/O 545, is stamped with additional information by IO Stamper 560. Again, when io3 535 reaches storage 570 it is stamped with additional I/O information by IO Stamper 576 and separated from the application I/O 572 to a shadow I/O store 580. The shadow I/O may then be analyzed by Application Behavior Analysis engine 585. However, in any given system there may be multiple applications on a system, which may result in shadow I/Os being injected for each application. As well, there may be many hosts communicating with given data storage system.

Figure 6:
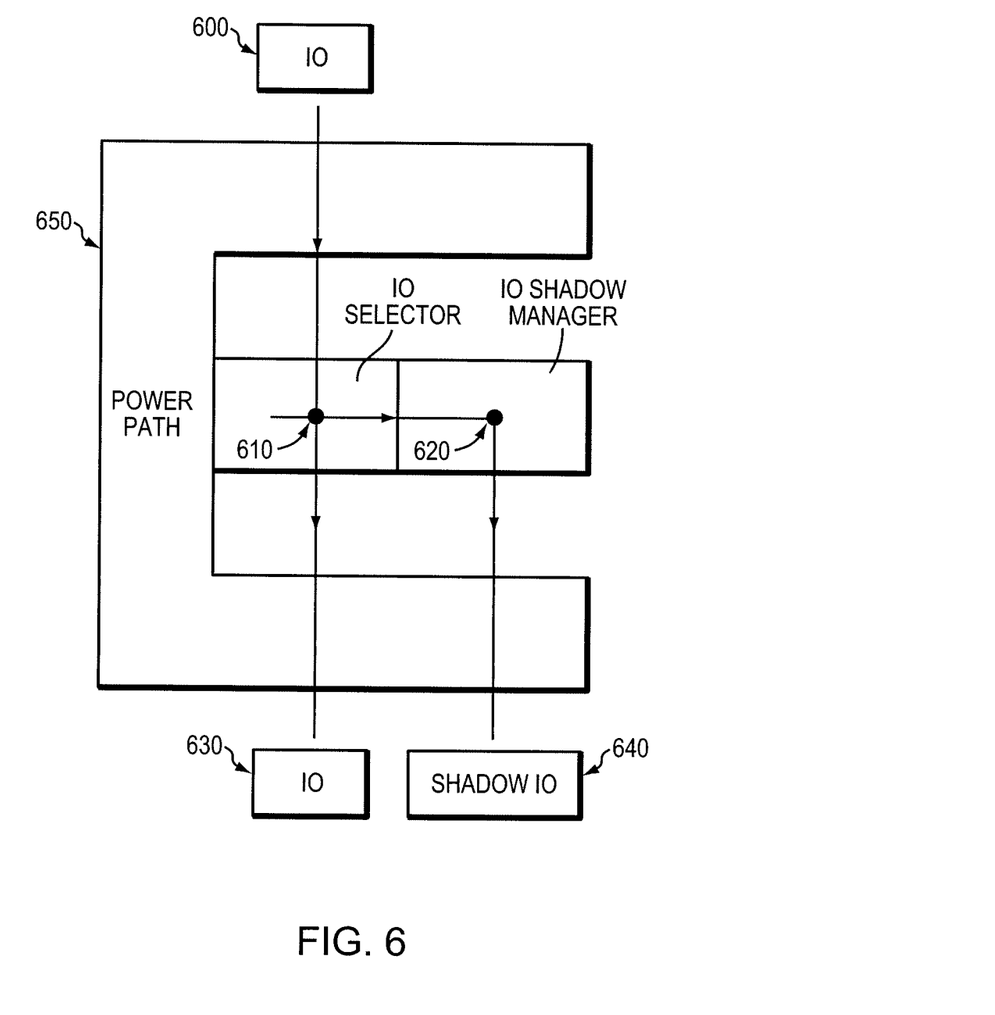
FIG. 6 show an implementation of the embodiment of FIG. 2 in accordance with the current techniques.

Referring now to FIG. 6, the "c-clamp" architecture of FIG. 2 has been overlayed with the components of the I/O Shadow Manager to illustrate how the shadow I/O may be implemented on a Power Path system. In this embodiment, IO 600 represents input into the PowerPath 650 system. In this example, IO 600 progresses into the middle of the PowerPath 650 "c-clamp" to IO Selector 610. When the IO 600 reaches the IO Selector 610, IO Shadow Manager 620 may inject a Shadow IO into the system. The IOs may progress out of the "c-clamp" structure to their final destination of IO 630 and Shadow IO 640. In some embodiments, the IO may be stored in a data storage system and the Shadow IO may be stored in a Shadow IO storage device.

Referring back to FIGS. 4 and 5, the Shadow I/O injector 447 may be configured in many ways. In general, the Shadow I/O injector 447 needs to be capable of monitoring the I/O in the system and able to inject Shadow I/Os into the system. The Shadow I/O injector 447 can be configured to inject Shadow I/O in a multitude of ways. For example, the Shadow I/O injector 447 may inject Shadow I/O at a given period of time. The Shadow I/O injector 447 could inject Shadow I/O whenever an application starts to send I/O as well as at the end of application I/O. As well, the Shadow I/O injector 447 may inject Shadow I/O at given periods of time during the transmission of application I/O. Further, the Shadow I/O injector 447 can be configured to inject Shadow I/O based on external input or instructions.

As well, PowerPath may use a selection algorithm to pick an IO for injection for the Shadow I/O injector. For example, PowerPath shadows IOs may be injected based on knowledge of shadow device. That is, PowerPath may manage shadow device space to analyze system behavior. In a particular embodiment of the current technique, there may be one shadow device per data storage array. As well, there may be one shadow injector for each host in the system. In another embodiment, PowerPath may write application information, original IO header and start timestamp into shadow IOs. In other embodiments, each shadow IO may have a unique identifier. PowerPath may also correlate end timestamp from original IO acknowledgement. In a further embodiment, PowerPath may aggregate original IO end timestamps and write to shadow device periodically.

In another aspect of the current techniques, the Application resource mapping correlator 470 may create mappings between applications which can be located in Application Space 330 and the IO performance and associated resources for each application. For POC, only endpoint resources may be available (e.g. host, array). In other embodiments, a process ID (pid) may be the application data in the Shadow IO. A user process on the host can periodically collect process list including pid, process name and timestamp.

The process may use iocmd (ioctl) at the shadow manager to send the process data to shadow device, such as shadow device 370. Ioctl is part of the user-to-kernel interface of a conventional operating system. Ioctls are typically employed to allow userspace code to communicate with hardware devices or kernel components. A correlator, such as correlator 470, may collect application information from shadow device 370. Shadow device 370 may have a metadata block to control region assignment for each host, such as Host 410. When PowerPath starts, it can read-in the metadata block and identify the region to use and next available space by looking for 0x00. Two regions may be assigned for each host. PowerPath can coordinate with correlator to process information in the non-use region immediately. In a further aspect of the current techniques, it is useful to note that can be numerous applications in Application Space 330. The current techniques enable analysis of each particular application, for example to understand the differences between applications running in the same host.

With the current techniques, applied to a system with multi-pathing, a parent IO and shadow IO could end up in different physical paths. The performance data of a particular application's shadow IO can be used as feedback to determine the frequency of injection of other shadow IO. As well, shadow IOs can contain any amount of variable information including process ID and pattern matching information. Multiple hosts may share the same shadow device or each host may have its own shadow device. Each host may have many applications and the Shadow IO may be used to determine the characteristics for each application.

Figure 7:
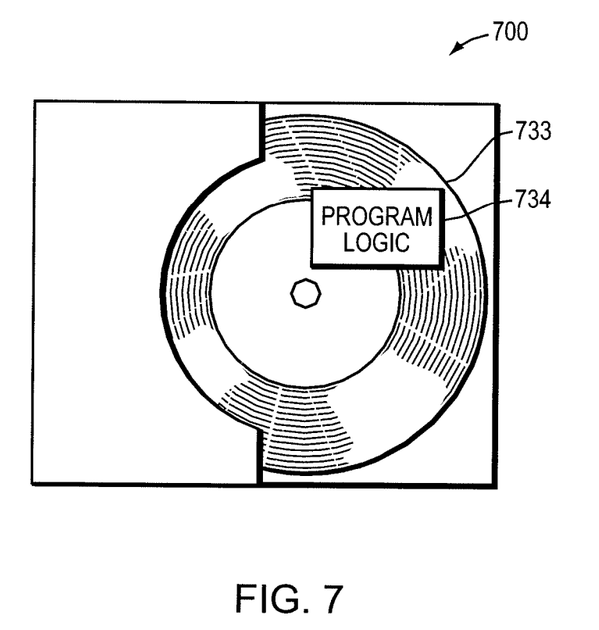
FIG. 7 shows a method embodied on a computer readable storage medium that may utilize the techniques described herein in accordance with an embodiment of the current disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 7 shows Program Logic 734 embodied on a computer-readable medium 730 as shown, and wherein the Logic is encoded in computer-executable code thereby forming a Computer Program Product 700.

The logic for carrying out the method may be embodied as part of the system described below, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
   injecting shadow input/outputs (shadow IOs) into an IO stack of a host system space of a data storage system, wherein the injecting IOs includes adaptive sampling of application-based use and behavior of Information Technology (IT) resources which is tuned dynamically to fit Quality of Service needs;
   removing the shadow IOs from the data storage system at a data storage subsystem of the data storage system; and
   using the shadow IOs to determine application behavioral information about the data storage system.

2. The method of claim 1 wherein the shadow IOs comprises application information, original IO header start timestamp and an unique identifier.

3. The method of claim 1 further comprising:
   creating correlation mapping between an application and the shadow IO associated resources.

4. The method of claim 1 wherein using the shadow IOs further comprises:
   determining application specific behavioral information for a plurality of applications.

5. The method of claim 1 wherein the injecting further comprises:
   injecting shadow IOs at a plurality of hosts.

6. The method of claim 1 wherein the injecting further comprises:
   injecting shadow IOs for a plurality of applications; and wherein the using the shadow IOs further comprises:
   determining application specific behavioral information for the plurality of applications.

7. The method of claim 1 wherein the shadow IOs are cloned IOs.

8. An apparatus comprising:
   an injecting device to inject shadow input/output (shadow IOs) into an IO stack of a host system space of data storage system, wherein the injecting IOs includes adaptive sampling of application-based use and behavior of Information Technology (IT) resources which is tuned dynamically to fit Quality of Service needs;
   a shadow device to remove the shadow IOs from the data storage system at a data storage subsystem of the data storage system; and
   an analyzer to analyze the shadow IOs to determine behavioral information about the data storage system.

9. The apparatus of claim 8 wherein the shadow IOs comprises application information, original IO header start timestamp, and a unique identifier.

10. The apparatus of claim 8 further comprising:
    a correlation mapping device to create a map between an application and the shadow IO associated resources.

11. The apparatus of claim 8 wherein analyzer device comprises:
    a behavior analyzer to determine application specific behavioral information for a plurality of applications.

12. The apparatus of claim 8 further comprises:
    a second injecting device to inject shadow input/output (shadow IOs) into a system; wherein the system comprises two hosts; wherein the injecting device is located on a first of the two hosts and the second injecting device is located on a second of the two hosts.

13. The apparatus of claim 8 wherein the injecting devices injects shadow IOs for a plurality of applications; and wherein the analyzer determines application specific behavioral information for the plurality of applications.

14. The apparatus of claim 8 wherein the shadow IOs are cloned IOs.

15. A system comprising:
    a computer having a memory;
    computer-executable program code operating in memory, wherein the computer-executable program code is configured for execution of the following:
       injecting shadow input/outputs (shadow IOs) into an IO stack of a host system space of a data storage system, wherein the shadow IOs comprises application information, original IO header start timestamp, and an unique identifier and wherein the injecting IOs includes adaptive sampling of application-based use and behavior of Information Technology (IT) resources which is tuned dynamically to fit Quality of Service needs;
       removing the shadow IOs from the data storage system at a data storage subsystem of the data storage system; and
       using the shadow IOs to determine application behavioral information about the data storage system.

16. The system of claim 15 wherein the program code is further configured for:
    creating correlation mapping between an application and the shadow IO.

17. The system of claim 15 wherein the program code is:
    further configured wherein the analyzing the stored shadow IOs further comprises:
       determining application specific behavioral information for a plurality of applications.

18. The system of claim 15 wherein the program code is:
    further configured wherein the injecting further comprises:
       injecting shadow IOs at a plurality of hosts.

19. The system of claim 15 wherein the program code is further configured wherein the injecting further comprises:
    injecting shadow IOs for a plurality of applications: and therein the analyzing the stored shadow IOs further comprises:
       determining application specific behavioral information for the plurality of applications.

20. The system of claim 15 wherein the shadow IOs are cloned IOs.

* * * * *